US011113348B2

(12) United States Patent
Walters (10) Patent No.: US 11,113,348 B2
(45) Date of Patent: Sep. 7, 2021

(54) DEVICE, SYSTEM, AND METHOD FOR DETERMINING CONTENT RELEVANCE THROUGH RANKED INDEXES

(71) Applicant: Austin Walters, Savoy, IL (US)

(72) Inventor: Austin Walters, Savoy, IL (US)

( * ) Notice: Subject to any disclaimer, the term of this patent is extended or adjusted under 35 U.S.C. 154(b) by 546 days.

(21) Appl. No.: 16/172,401

(22) Filed: Oct. 26, 2018

(65) Prior Publication Data

US 2019/0347302 A1     Nov. 14, 2019

Related U.S. Application Data

(60) Provisional application No. 62/670,030, filed on May 11, 2018.

(51) Int. Cl.
| | |
|---|---|
| *G06F 16/00* | (2019.01) |
| *G06F 16/9535* | (2019.01) |
| *G06F 16/907* | (2019.01) |
| *G06F 16/901* | (2019.01) |
| *G06F 16/903* | (2019.01) |

(52) U.S. Cl.
CPC ........ *G06F 16/9535* (2019.01); *G06F 16/901* (2019.01); *G06F 16/907* (2019.01); *G06F 16/90335* (2019.01)

(58) Field of Classification Search
CPC .. G06F 16/9535; G06F 16/901; G06F 16/907; G06F 16/90335
USPC ........................................................ 707/736
See application file for complete search history.

(56) References Cited

U.S. PATENT DOCUMENTS

| 6,285,999 B1 | 9/2001 | Page |
| 6,799,176 B1 | 9/2004 | Page |
| 7,058,628 B1 | 6/2006 | Page |
| 8,868,590 B1 | 10/2014 | Donneau-Golencer |
| 9,424,612 B1* | 8/2016 | Bright .................... G06Q 50/01 |
| 2008/0270151 A1* | 10/2008 | Mahoney ............... G06Q 30/02 705/1.1 |
| 2009/0119258 A1* | 5/2009 | Petty ...................... G06Q 10/10 |
| 2010/0030753 A1 | 2/2010 | Nad et al. |
| 2016/0203523 A1* | 7/2016 | Spasojevic ......... G06Q 30/0269 705/14.66 |

* cited by examiner

*Primary Examiner* — Chelcie L Daye
(74) *Attorney, Agent, or Firm* — Singleton Law Firm, P.C.

(57) ABSTRACT

A system and method for determining content relevancy within a computer network and generating a database. Content including but not limited to, a document, media, or any other digital or real objects. The method includes: identifying and creating an index of users on the network and identifying expert users through the use of profile generation. The profiles are monitored and updated, as well as connected with others to generate value indicators assigned to content articles within the network. The content is then ranked based on the indicator value, with the values being fluidic and based upon the ongoing actions of users on the network. Searches of the system are further coordinated by adaptive, context aware protocols whereby content is filtered or included based on given intricate associations with other content and users themselves.

17 Claims, 6 Drawing Sheets

FIG. 1

Per Topic

Meta Profile Scores (Topic X)

| PROFILES (Meta) | TOTAL SCORE | EXPERTISE | INSIDER KNOWLEDGE |
|---|---|---|---|
| Profile #1 | 1.0 | 1.0 | 1.0 |
| Profile #2 | 0.8 | 0.76 | 0.85 |
| Profile #3 | 0.3 | 0.4 | 0.23 |
| Profile #4 | 0.15 | 0.23 | 0.1 |
| Profile #5 | 0.0 | 0.12 | 0.0 |

Meta Profile Scores (Topic A)

| PROFILES (Meta) | TOTAL SCORE | EXPERTISE | INSIDER KNOWLEDGE |
|---|---|---|---|
| Profile #1 | 0.85 | 0.90 | 0.5 |
| Profile #2 | 0.72 | 0.55 | 0.4 |
| Profile #3 | 0.34 | 0.42 | 0.2 |
| Profile #4 | 0.2 | 0.25 | 0.1 |
| Profile #5 | 0.1 | 0.1 | 0.0 |

Per Author

Meta Profile Score (Profile #1)

| TOPICS | TOTAL SCORE | EXPERTISE | INSIDER KNOWLEDGE |
|---|---|---|---|
| Topic A | 1.0 | 1.0 | 1.0 |
| Topic B | 0.8 | 0.76 | 0.85 |
| Topic C | 0.3 | 0.4 | 0.23 |
| Topic D | 0.15 | 0.23 | 0.1 |
| Topic E | 0.0 | 0.12 | 0.0 |

Meta Profile Score (Profile #2)

| TOPICS | TOTAL SCORE | EXPERTISE | INSIDER KNOWLEDGE |
|---|---|---|---|
| Topic A | 0.95 | 0.90 | 0.5 |
| Topic B | 0.72 | 0.55 | 0.4 |
| Topic C | 0.34 | 0.42 | 0.2 |
| Topic D | 0.2 | 0.25 | 0.1 |
| Topic E | 0.1 | 0.1 | 0.0 |

FIG. 3

| Content Score (Topic X) | | | | |
|---|---|---|---|---|
| CONTENT | TOTAL SCORE | EXPERTS DISCUSSING | WEIGHT OF EXPERTISE | Last Updated |
| Content #1 | 1.0 | 1.0 | 1.0 | 2018-01-01 |
| Content #2 | 0.8 | 0.76 | 0.85 | 2017-01-01 |
| Content #3 | 0.3 | 0.4 | 0.23 | 2017-01-01 |
| Content #4 | 0.15 | 0.23 | 0.1 | 2016-01-01 |
| Content #5 | 0.0 | 0.12 | 0.0 | 2018-01-01 |

| Content Score (Topic A) | | | | |
|---|---|---|---|---|
| CONTENT | TOTAL SCORE | EXPERTS DISCUSSING | WEIGHT OF EXPERTISE | Last Updated |
| Content #1 | 0.9 | 1.0 | 1.0 | 2018-01-01 |
| Content #2 | 0.8 | 0.65 | 0.85 | 2017-01-01 |
| Content #3 | 0.3 | 0.33 | 0.23 | 2017-01-01 |
| Content #4 | 0.15 | 0.1 | 0.1 | 2016-01-01 |
| Content #5 | 0.0 | 0.0 | 0.0 | 2018-01-01 |

DEVICE, SYSTEM, AND METHOD FOR DETERMINING CONTENT RELEVANCE THROUGH RANKED INDEXES

CROSS-REFERENCE TO RELATED APPLICATIONS

This application claims the benefit of U.S. Provisional Application No. 62/670,030, filed on May 11, 2018, under 35 U.S.C. 119(e).

BACKGROUND OF THE INVENTION

The present invention relates to data and content searching and indexing. Specifically, a system and method for determining content article relevance of a given topic. The method includes identifying and creating an index of perceived experts, insiders, or authors within the computer network; using the index to score and rank content article relevance to a given topic or subject matter; the index of experts being used to rank content articles for searches, improve search query results based on an author profile, and search the expert-insider index itself.

The present invention attempts to remedy the shortcomings of current search systems by providing a system and method capable of determining content relevance through utilization of real-time data parsing and updated article and user profile indexes, thereby ranking content based on an expertise level of a given user in a given article on a given topic.

BRIEF DESCRIPTION OF THE INVENTION

The present invention provides a system and method for determining content relevance through real-time data collection and analytics, such that articles of content are ranked based on an indexing of user profiles, using both explicit and implicit indicators.

The method includes identifying at least one user and generating an index of at least one domain expert, insider, or author based on at least one piece of generated content; then ranking content relevance to a given topic or subject matter using the generated index as a scale. The index of experts and insiders can then be used to rank content for searches, improve search query results based on an author profile, and search the expert-insider index itself.

The described system is configured to parse digital discussions in real-time, update social profiles, update meta profiles, each being a combination of social profiles associated with a particular entity, and rank content articles. With the content article ranked and indexed, expedited search queries regarding the same and similar content may be performed that result in highly specific and relevant search results.

In another embodiment of the invention, the system may further comprise at least one database framework and management scheme configured to reduce search and indexing times; said scheme may include but is not limited to map reduce, relational database management systems (such as MySQL), non-relational database management systems or wide column stores (such as NoSQL or BigTable), object-relational database management systems (such as PostgreSQL), document-oriented database (such as MongoDB), or another framework capable of indexing functions known to a person of ordinary skill in the art.

The methods, systems, and apparatuses are set forth in part in the description which follows, and in part will be obvious from the description, or can be learned by practice of the methods, apparatuses, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed. More details concerning these embodiments, and others, are further described in the following figures and detailed description set forth herein below.

DETAILED DESCRIPTION OF THE INVENTION

The present invention is described in reference to the accompanying drawings and following embodiments that are presented for the purpose of illustration and should not be construed to limit the scope of the invention thereto.

Figure 1:
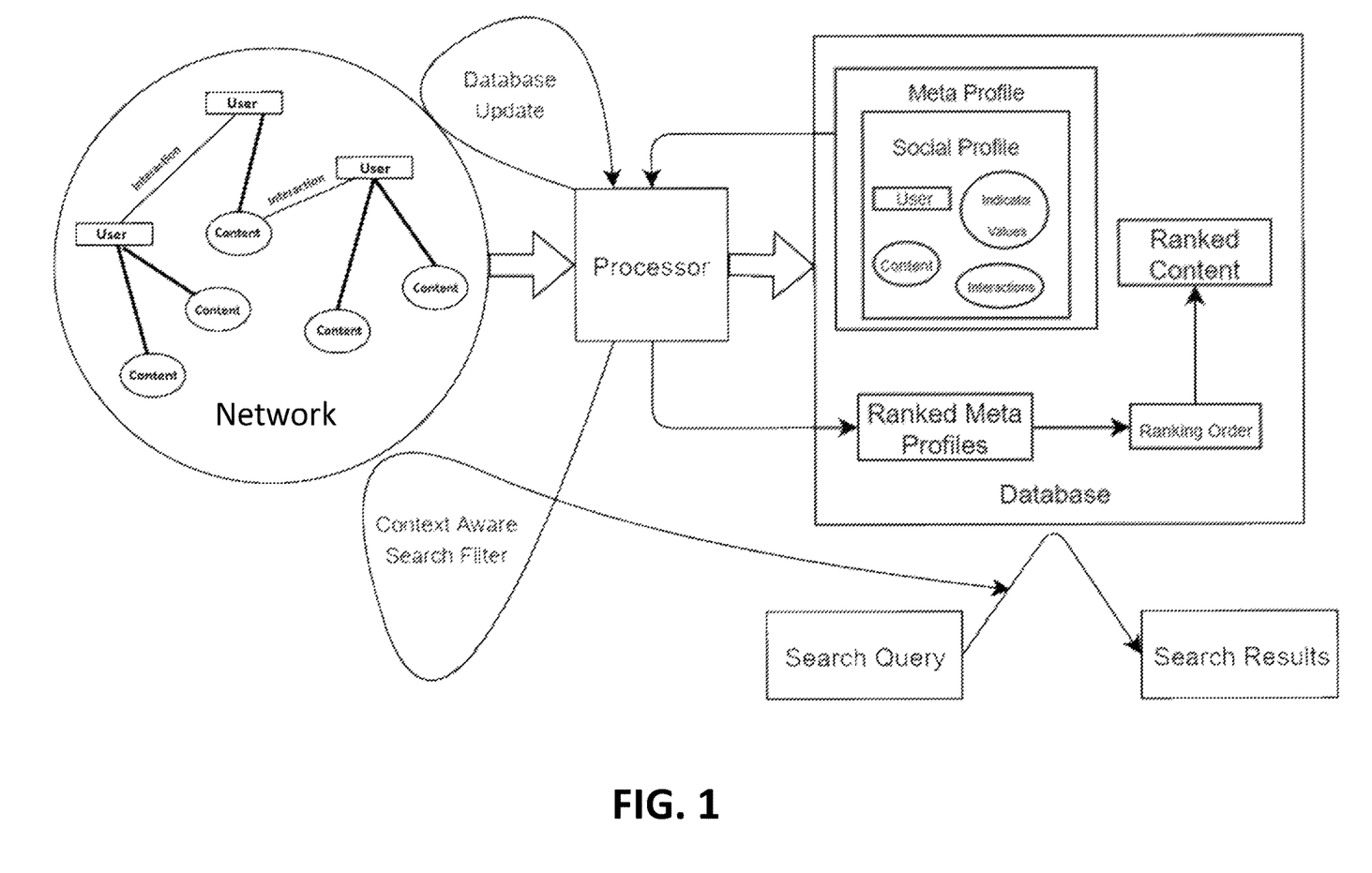
FIG. 1 illustrates a diagrammatic overview of the invention.

The present invention, as shown in FIG. 1, provides a system and method for determining content relevance within a given network or subnetwork and ranking a generated index of said content comprising the following; at least one user search and identification protocol, at least one social profile data collection protocol, at least one meta profile generation protocol, at least one content collection and indexing protocol, and at least one ranking protocol. The system determines, records, and indexes at least one relevance value of at least one given content article based on interactions by and between expert-insider users, the expert-insider users also being ranked based upon prior data identification, collection, and indexing. The system then generates at least one database of the identity of at least one social profile, the ranking of at least one meta profile, and the relevance value of at least one content article. The at least one database may be further configured to connect to, reference data from, and exchange data with at least one additional generated database.

The present inventive method of determining content relevancy comprises a step wherein at least one content article is ranked by interactions, discussions, and reactions by at least one ranked expert user or insider user, which provides a context by which a ranking and indexing protocol is performed. For example, an ongoing discussion around a content article explicitly pertaining to a Topic A may exist on a network. The content article may also be assigned a high rank related to Topic B if discussions by experts and insiders discuss a Topic B alongside or in conjunction with the content article. The content article may be categorized as any of the following: images, documents, audio files, objects, or another electronic medium or reference to an article on a network; including but not limited to html links, geographical coordinates, or article identification numbers. The invention may further analyze the categorized content and assign a context indicator the indicator and provide to a user or database at least one example of other content determined by the system to be related to the categorized content through assigned context indicators, thereby forming a context-aware system for searching. The formation of content-awareness in searching and indexing by the system may further comprise generation of one or more search graphs or search protocols by the system. Additionally, in some embodiments of the invention, a given content article may not require analysis or categorization. In such embodiments, the system is configured to analyze and categorize one or more interactions between one or more users and the given content article and form an inference based off of said interactions as if the content article itself were analyzed.

The system further comprises a non-transitory computer-readable medium that, when executed by at least one computer processor, performs the steps of the method. A person of ordinary skill in the art will understand and appreciate the term "computer processor" may refer to a central control unit (CPU) of a computer, a microprocessor of the CPU, or parallel processors of one or more connected computers configured to execute the invention and carry out the steps thereof. The number and specific configuration of processors may be determined by a user and may be based on the size of the computer network involved, the technological capabilities of the one or more processors, as well as a user-chosen database framework and management scheme.

Generating Social Profiles from Known and Discovered Sources of Data

Figure 2A:
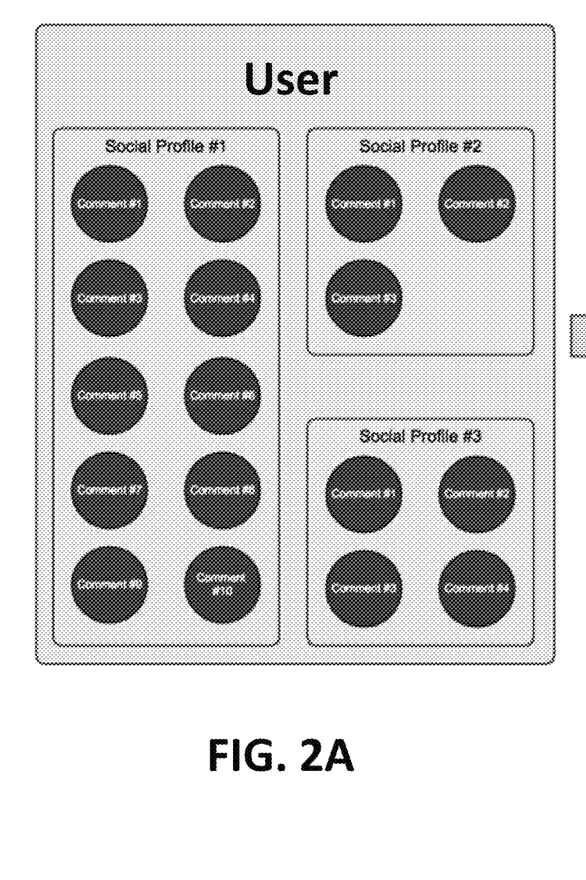
FIG. 2A illustrates generation of social profiles from aggregated indicators collected from users on a computer network or subnetwork.

The present invention is configured to first parse expert user and insider user discussions in real time without significant inherent latency, while also simultaneously collecting data and updating at least one social profile and/or at least one meta profile, as represented in FIG. 2A. The simultaneous collection, indexation, and updating profiles forms an on-going supportive framework further used by the system to rank content. With the content ranked, it is possible to quickly search over the content for an optimal piece of related content to fit a given search query.

A social profile may comprise at least one token, at least one username, or at least one real name associated with a user for use within a given network, for the use of identifying a user's information, such as bank records. A social profile is a token, username, or real name associated with a user for use across a system, network, or subnetwork, for the use of identifying a user, a user's information, or content generated by a user within the network or subnetwork. A person of ordinary skill in the art will understand and appreciate that a social profile may comprise at least one content indicator, including but not limited to at least one comment, discussion, internal instant message, resume, phone call or call log, email, or other user-generated content identified by the system and linked to a user within a network and a database.

Those of ordinary skill in the art will appreciate that techniques known in the art such as, for example, mapreduce may be further implemented into the system in order to decrease search times and regulate general resource use and efficiency within the system.

Estimating Expertise and Insider Knowledge to Generate Meta Profiles for Users

In one embodiment of the invention, a protocol is performed comprising of identifying and processing at least one comment, discussion, interaction, or another social indicator associated with social profiles and index all identified social indicators for a given user. A person of ordinary skill in the art will understand and appreciate that a protocol of confirming a given social indicator or social profile is associated with a particular person may be performed with a degree of error, such that a particular social indicator may be indexed with a particular social or meta profile where it is statistically probable that doing so is correct. A person of ordinary skill would further appreciate that a user may be a human, an artificial intelligence, a generated protocol, or other suitable entity capable of actions within the network.

In some embodiments, the invention may further comprise identification of at least one user's interests and knowledge, as well as identification of at least one associate user's interests and knowledge. The system further comprises a protocol whereby the data of interests and knowledge are indexed and a graph is generated therefrom. Identification of interests and knowledge may comprise using standard natural language programming (NLP) methods; for example word count identifiers, recurrent neural networks, recursive neural networks, word trees, and self-organizing maps. A person of ordinary skill in the art would appreciate that the method or methods used for identification may comprise one or more techniques known to the art.

The identified interests and knowledge may then be processed alongside identified interests and knowledge of one or more of the user's associate users to estimate user expertise and insider knowledge. Processing collected data into expertise estimations may comprise any technique known in the art, such standard clustering, recurrent neural networks, recursive neural networks, convolutional neural networks.

A person of ordinary skill in the art will understand and appreciate that a user or a user's associate may be an actual person, an artificial intelligence, or another configuration of an entity capable of interacting on a network or subnetwork.

Figure 2B:
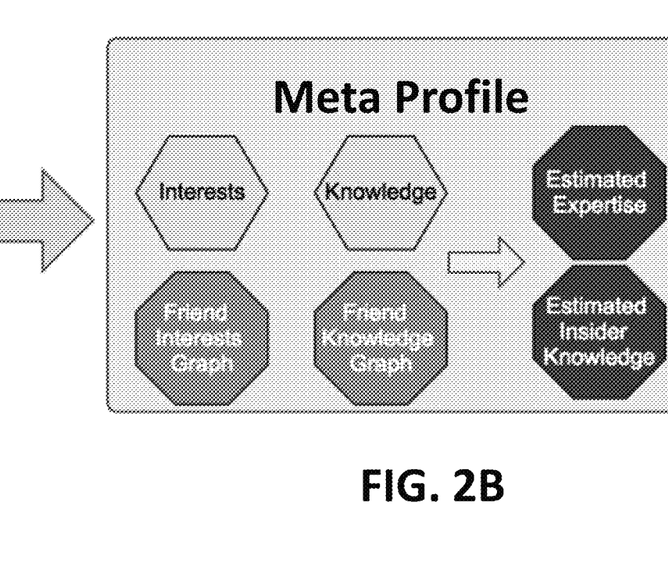
FIG. 2B illustrates generation of meta profiles from the generated social profiles in a computer network or subnetwork.

A user's identified and collected knowledge and interests collected from social profiles, estimated expertise, estimated insider knowledge, and user associate users' interests and knowledge; collectively identified as a meta profile, may then be indexed and ranked by the inventive system. In other embodiments of the invention, content and social indicators may be indexed and processed to generate a meta profile, shown in FIG. 2B associated with a given topic, rather than a given user, thereby noting which social profiles are linked to particular topics. Linkage between a topic meta profile and a user meta profile may be generated through ranking of one meta profile type and then utilizing said ranking to perform a ranking of another meta profile type, as is discussed below.

Database Generation and Ranking and Indexing of Profiles

Figure 3:
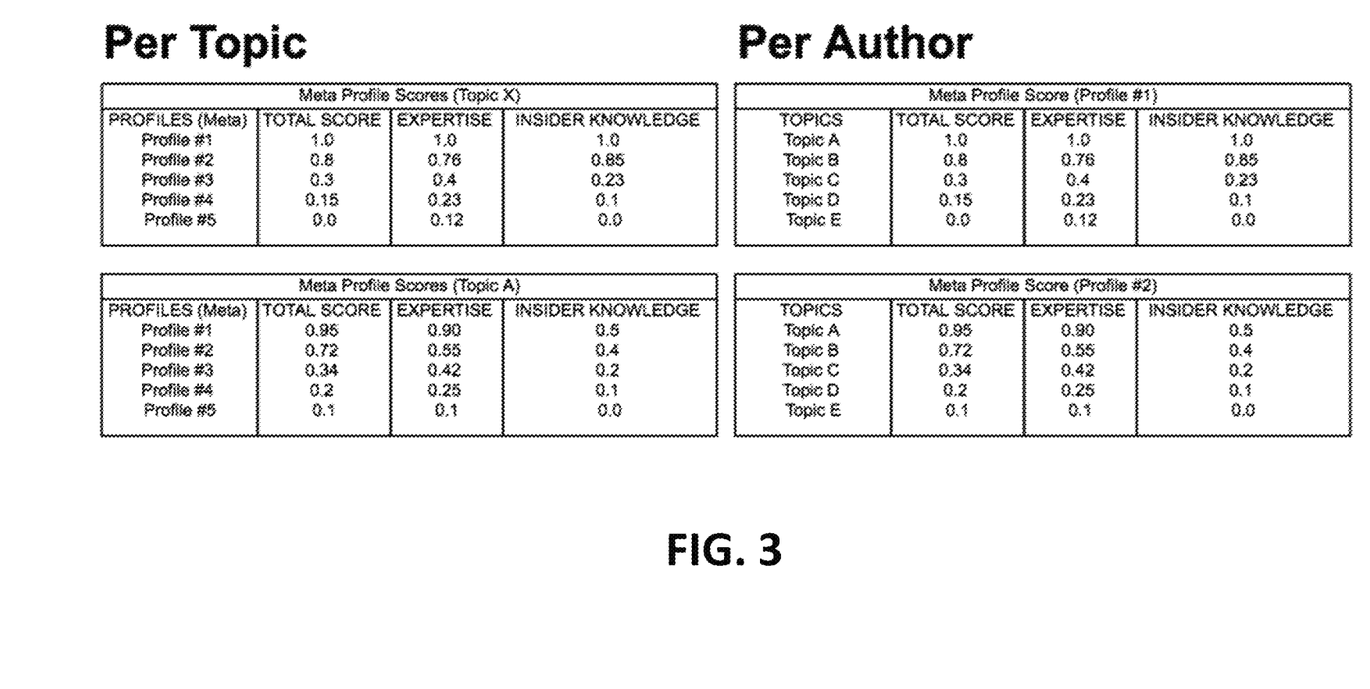
FIG. 3 illustrates generation of database entries and assigning indicator values to each meta profile.

The current invention further comprises a protocol configured to rank at least one feature of the meta profile with respect to a given topic, as shown in FIG. 3. The feature may comprise the expertise, the insider knowledge, or a general log of breadth of topics discussed by the user. The inventive system may further keep a linked log of specific content articles pertinent to said ranking processes. In another embodiment of the invention, the invention may further rank at least one topic with respect to which meta profiles are linked to the topic, either through at least one identified content or social indicator of the social profile associated with a given meta profile. A person of ordinary skill in the art will understand and appreciate that the inventive system and method may comprise both a database of ranked meta profiles by topic and a database of ranked meta profiles by author, the author comprising a source for a given social indicator or content article.

The invention may comprise generation of a database, further comprising creation of at least one database entry for each meta profile. Each entry may comprise at least one of the following: an aggregated total score indicator, an estimated expertise indicator, an estimated insider knowledge indicator, an interests indicator, a knowledge indicator, at least one generated user associate interest graph linked within the database, at least one generated user associate knowledge graph linked within the database, and at least one social profile comprising at least one content indicator or social indicator, including but not limited to comments, discussion, internal instant message, resume, phone call or call log, email, or other user-generated content linked within the database. In some embodiments, at least one generated user associate interest graph or at least one generated user associate knowledge graph may further comprise a linkage to a meta profile associated with a given associate user.

Within the database, an index may be generated from a plurality of topics, enabling quick queries. A topic index entry may be configured such that whenever a new content article is discussed by a meta profile; a comment made by or in connection with the meta profile is re-indexed based on an aggregated total score, aggregated from at least one expertise indicator and at least one knowledge indicator. For example, if a known employee of a tech company, where said employment is identified by the system in collected social indicators such as comments or interactions on a network, is discussing that tech company, the meta profile associated with the employee would be assigned a higher aggregated total score indicator with respect to topics involving said tech company. The meta profile may then be re-indexed within the database to reflect the discovery and change in the score indicator. Further, all existing identified content connected to the employee's meta profile may also be assigned an updated higher score indicator where the tech company is discussed.

Identifying and Ranking Content

Figure 4A:
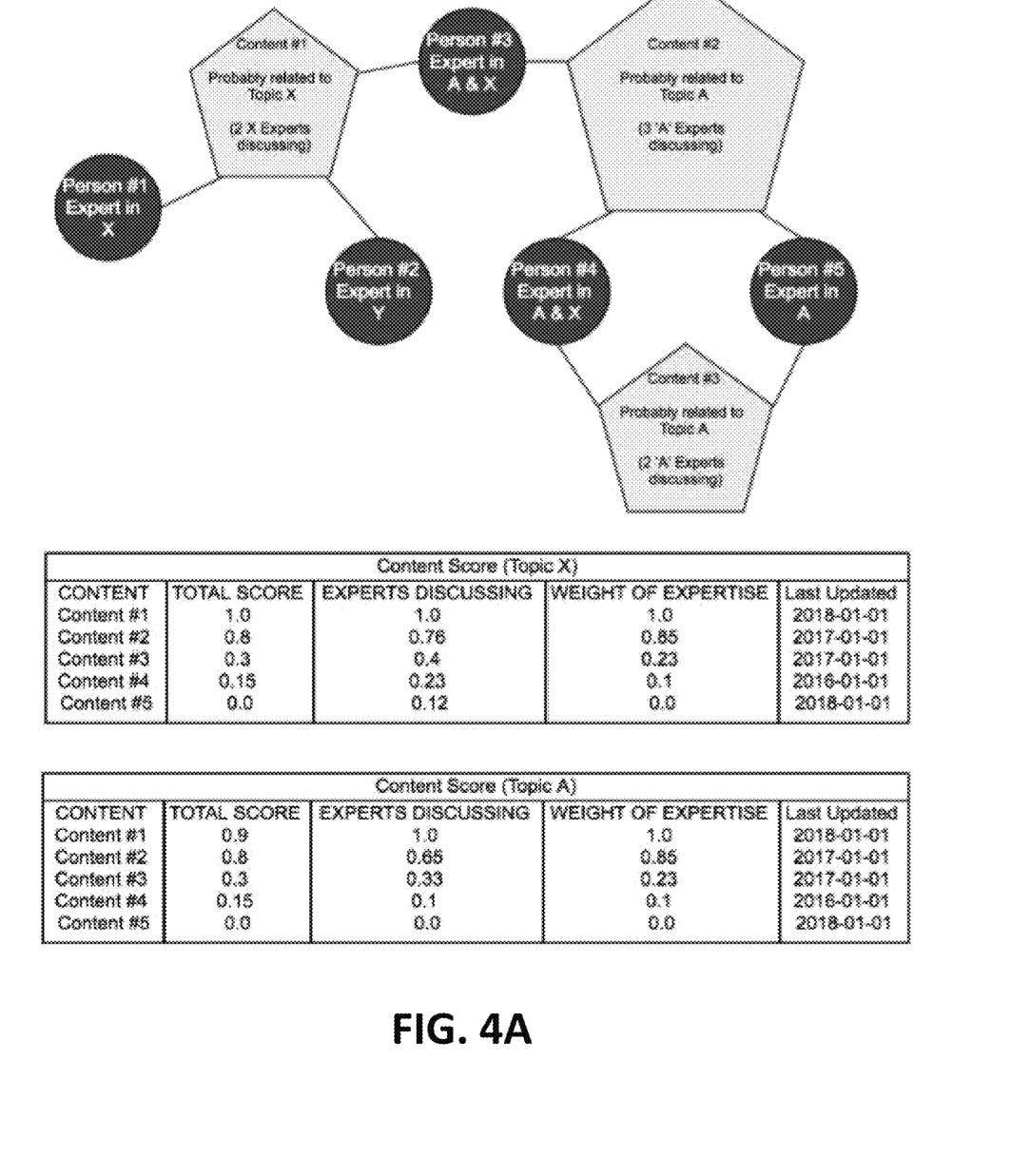
FIG. 4A illustrates ranking of content based on interactions of ranked meta profiles.

A total score may also be assigned to a given content article, the total score comprising a value by which each content article may be arranged and ranked with respect to other content articles. The total score may be configured such that the total score value is higher when more experts are discussing the content article, with a higher weight. A modifying indicator may further be assigned to a content article, such as for level of technical expertise involved or for nicheness of the content article. The modifying indicator may further impact the calculation and assignment of the total score of the content article. A degree of modification that a given modifying indicator may have on the total score can be identified by the system based on a given feature of the content. For example, as represented in FIG. 4A, the number of related technical terms are used, the complexity of the discussion, and the number of non-experts discussing said content may be used to assign a modifying indicator for technical expertise or nicheness.

In some embodiments of the invention, any changes in meta profiles for given users or topics may trigger a re-indexing of at least one related meta profile. Re-indexing of meta profiles may then further trigger changes in the total score of at least one other content article. A person of ordinary skill in the art will understand and appreciate that this process may be used to implement fluidic ranking of all content articles within a network or subnetwork, such that an action or interaction by one or more highly ranked users involving a given content article may influence and determine the ranking of that content article along with any related content articles.

Rank-Based Searching and Filtering of Content

Figure 4B:
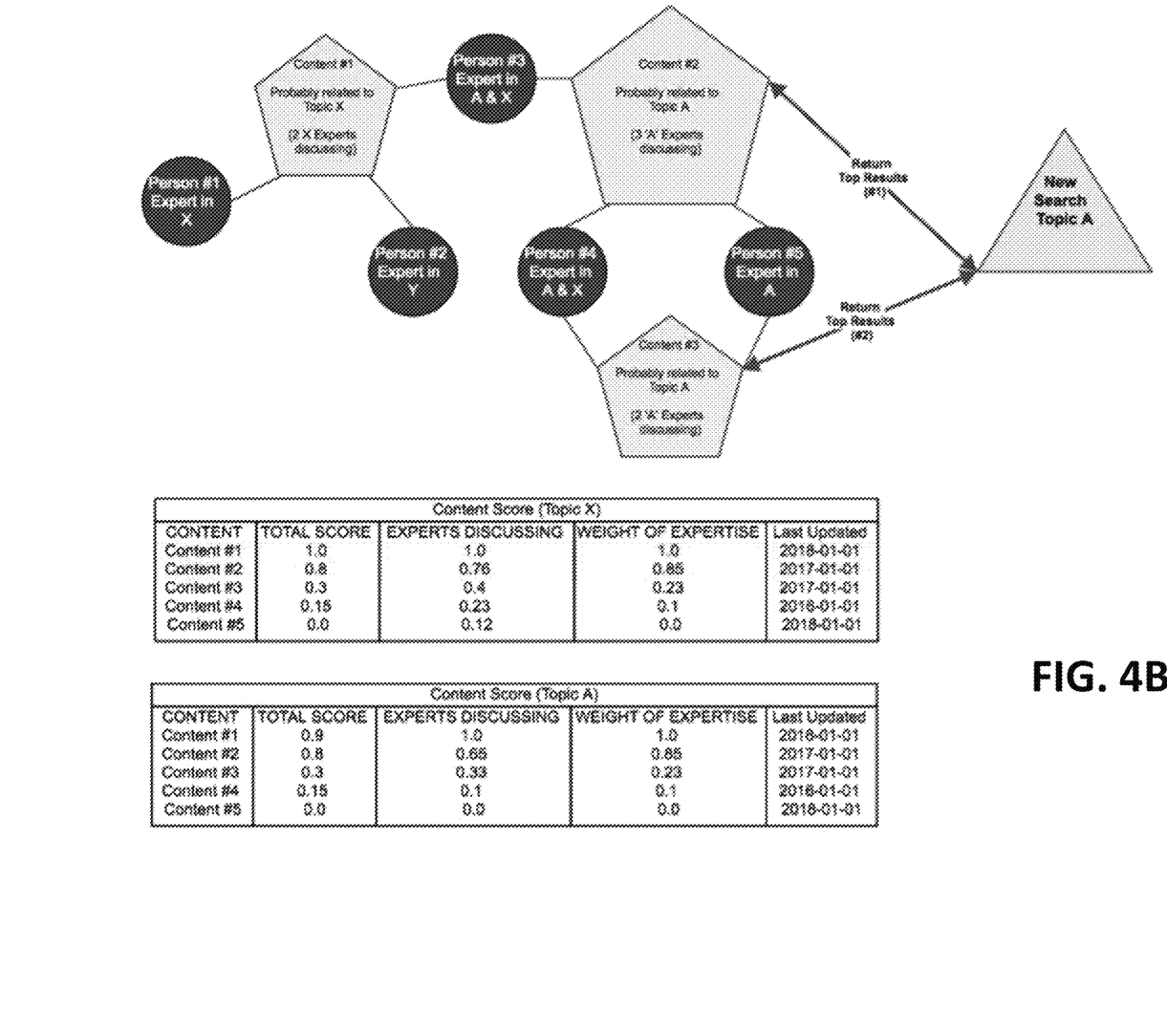
FIG. 4B illustrates fluidic searching of the database entries and content based on associations between meta profiles.

The ranked database may further comprise search features and filter features, configured to allow all database entries to be arranged and viewed based on a given desired input, such as searching the database for the highest total score for a content article, as shown in FIG. 4B. In other embodiments, the time the content was created, the time the total score of the content was last updated, or the time the content article was last discussed by or linked to a given meta or social profile may also influence the search algorithm. Such influences, however, are configured such that the influence of the total score based ranking and fluidic changes thereto comprise a majority of total influence on a given algorithm.

Context Aware Search of Content

Figure 5:
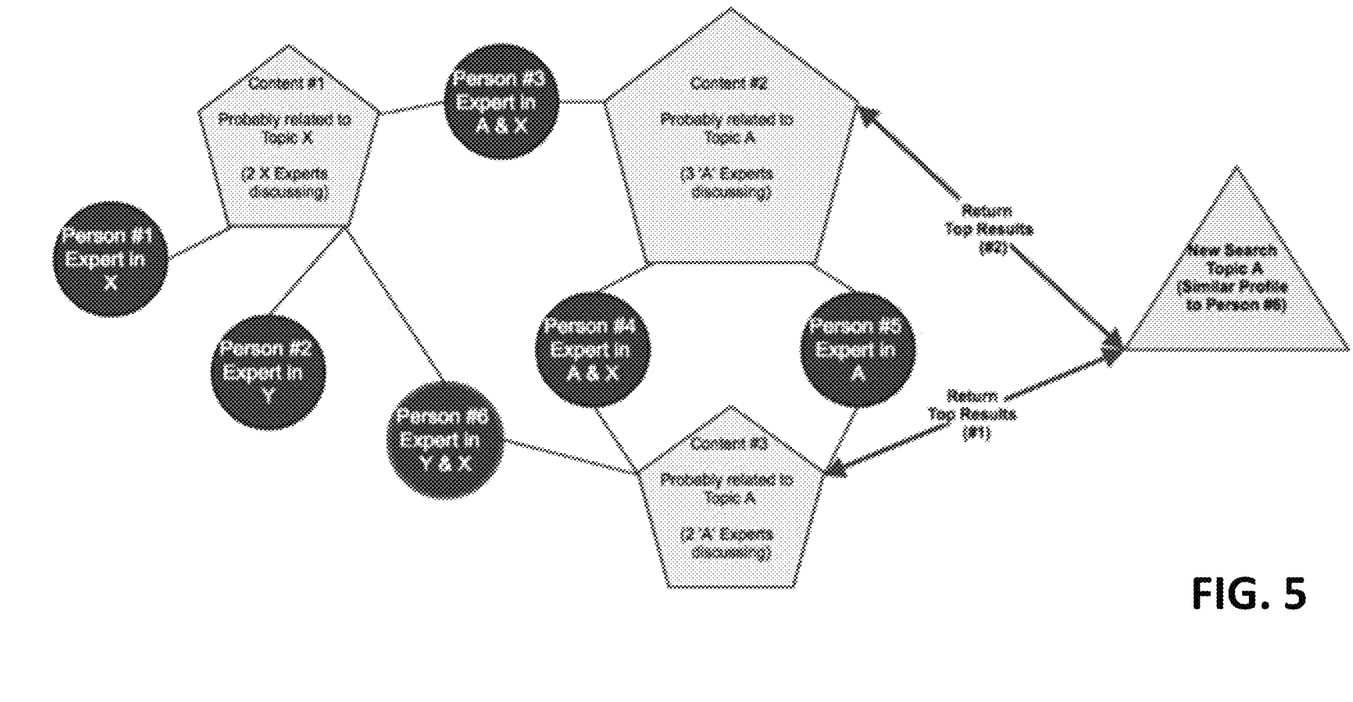
FIG. 5 illustrates adaptive, context aware searching of the ranked database, specifically incorporation and filtering of related relevant database entries based on meta profile characteristics and association.

The system may further be configured to match up and link one or more meta profiles to other meta profiles through identified associations and machine learning, thereby increasing search result relevance values. In one embodiment, as shown in FIG. 5, the system, utilizing already-identified meta profiles and associated user expertise may associate a newly identified meta profile with a cluster of meta profiles where both the individual and the group have been assigned relatively high ranks with respect to a given topic or area of expertise. Further, where a search inquiry is performed, search results will include content articles associated with the newly identified meta profile alongside content associated with the group or cluster of already identified meta profiles, thus ensuring relevant content is displayed. In another embodiment, a meta profile may be identified based on one or more search queries a user associated with the meta profile enters into the system. In this embodiment the meta profile may then be linked to and associated with another group or cluster of meta profiles that either have performed similar search inquiries or are associated with a topic of the search inquiry.

A person of ordinary skill in the art will understand and appreciate that, with respect to matching a related single or cluster of meta profiles, a given level of technical expertise, a given complexity of a discussion, and other content attributes may be taken into consideration when ranking said content to the user. The inventive system may be modulated to track specific discussions based on characteristics, as well as self-modulation to track newly identified characteristics that may specify, limit, or increase assignment of at least one modifying indicator, content indicator, social indicator, expertise indicator, and ultimately the total score used to rank content. Additionally, a user may further specify one or more of the indicators for the system to ignore completely or one or more of the indicators with which the system is limited to for ranking processes and search query output production.

In another embodiment of the invention, the system may limit or specify one or more of the indicators in which to use for search queries, wherein the specified indicators are chosen based on the meta profile of the user submitting the query. This, in conjunction with user-specified indicators, would enable a user to perform a search query designed to produce an exact match tailored to an indicator associated with that user.

Below is a partial example of computer-implemented code, that when executed is configured to track discussions within a given computer network.

```python
import operator
import requests
import datetime
import json
import time
import csv
import os
import sys
import ast
lib_path = os.path.abspath(os.path.join('. .', 'lib'))
sys.path.append(lib_path)
from collections import Counter
from bs4 import BeautifulSoup
from sentiment_analysis import SentimentAnalysis
# load the psycopg to connect to postgresql
import psycopg2
import psycopg2.extras
global cur
global filename
global comment_score
global word_score
global story_score
global author_score
global analysis
# Find the database parameters
with open("../config/postgres.tsv", 'rb') as tsvfile:
    r = csv.reader(tsvfile, delimiter='\t')
    for row in r:
# Try to connect
try:
    conn = psycopg2.connect(database=params["database"],
                            user=params["user"],
                            password=params["password"],
                            host=params["host"],
                            port=params["port"],
                            sslmode='require')
except:
    print ("I am unable to connect to the database.")
    exit()
cur = conn.cursor()
print("Connected to database")
def clamp(n, smallest, largest):
    return max(smallest, min(n, largest))
def init_csv(filename, columns):
    with open(filename, 'w') as f:
        writer = csv.writer(f, delimiter='\t')
        writer.writerow(columns)
def merge_two_dicts(x, y):
    return dict(Counter(x) + Counter(y))
def add_words_to_word_score(comment_sentiment, title_sentiment):
    """
    Add words to the word_score global dict()
    :param comment _sentiment: The sentiment analysis dict() for the comments
    :param title_sentiment: The sentiment analysis dict() for the title
    """
    movie_sentiment   = comment_sentiment["movie"]
    vader_sentiment   = comment_sentiment["vader"]
    naive_sentiment   = comment_sentiment["naive"]
    overall_sentiment = comment_sentiment["overall"]
    overall_sentiment["subjects"] = (overall_sentiment["subjects"]
                                     + title_sentiment["overall"]["subjects"])
    overall_sentiment["subjects"] = [x.lower() for x in overall_sentiment["subjects"]]
    # Calculate word score
    for word in overall_sentiment["subjects"]:
        word = word.lower()
        re = ['~', '-', '_', '"', '*', '^']
        for r in re:
            word = word.replace(r, '')
        if word in word_score:
            word_score[word]["count"] += 1
            word_score[word]["total_score"]    += overall_sentiment ["score"]
            word_score[word]["movie_score"]    += round(movie_sentiment["pos"] -
                                                  movie_sentiment["neg"], 3)
            word_score[word]["vader_score"]    += round(vader_sentiment["pos"] -
                                                  vader_sentiment["neg"], 3)
            word_score[word]["naive_score"]    += round(naive_sentiment["score"], 3)
```

```
            word_score[word]["score"] = round(word_score[word]["total_score"] /
                                              word_score[word]["count"], 3)
        else:
            word_score[word] = {
                "count": 1,
                "total_score": overall_sentiment ["score"]
                "movie_score": (movie_sentiment["pos"] - movie_sentiment["neg"]),
                "vader_score": (vader_sentiment["pos"] - vader_sentiment["neg"]),
                "naive_score": (naive_sentiment ["score"]),
                "score": overall_sentiment ["score"]
            }
def add_story_to_story_score(comment_sentiment, story_title, discussion_link,
                             story_url, key_words):
    """
    Add story to the story_score global dict()
    :param comment_sentiment: The sentiment analysis dict() for the comments
    :param story_title: The title of the story
    :param key_words: A dict() of the key words (with a value of 1 for each key word)
    """
    movie_sentiment     = comment_sentiment["movie"]
    vader_sentiment     = comment_sentiment["vader"]
    naive_sentiment     = comment_sentiment["naive"]
    overall_sentiment   = comment_sentiment["overall"]
    # Calculate story score
    if story_title in story_score:
        story_score[story_title]["count"]           += 1
        story_score[story_title]["total_score"]     += overall_sentiment["score"]
        story_score[story_title]["movie_score"]     += round(movie_sentiment["pos"] -
                                                             movie_sentiment["neg"], 3)
        story_score[story_title]["vader_score"]     += round(vader_sentiment["pos"] -
                                                             vader_sentiment["neg"], 3)
        story_score[story_title]["naive_score"]     += round(naive_sentiment["score"], 3)
        story_score[story_title]["key_words"]        = merge_two_dicts(key_words,
story_score[story_title]["key_words"])
    else:
        story_score[story_title] = {
            "count": 1,
            "total_score": overall_sentiment ["score"]
            "discussion_link": discussion_link,
            "story_url": story_url,
            "movie_score': (movie_sentiment["pos"] - movie_sentiment["neg"]),
            "vader_score": (vader_sentiment["pos"] - vader_sentiment["neg"]),
            "naive score': (naive_sentiment["score"]),
            "key_words": key_words
        }
def add_author_to_author_score(comment_sentiment, discussion_link, author, key_words):
    """
    Add author to the author_score global dict()
    :param comment_sentiment: The sentiment analysis dict() for the comments
    :param discussion_link: The discussion_link allows for linking back to story_title
    :param author: The author name of the comment
    :param key_words: A dict() of the key words (with a value of 1 for each key word)
    """
    movie_sentiment     = comment_sentiment["movie"]
    vader_sentiment     = comment_sentiment["vader"]
    naive_sentiment     = comment_sentiment["naive"]
    overall_sentiment   = comment_sentiment["overall"]
    if author in author_score:
        author_key_words = merge_two_dicts(key_words, author_score[author]["key_words"])
        author_score[author]["count"] += 1
        author_score[author]["total_score"] += overall_sentiment["score"]
        if discussion_link in author_score[author]["stories"] :
            author_score[author]["stories"][]discussion_link] += 1
        else:
            author_score[author]["stories"][disucussion_link] = 1
        author_score[author]["key_words"] = author_key_words
    else:
        author_score[author] = {
            "count": 1,
            "total_score": overall_sentiment["score"],
            "stories": {discussion_link: 1 },
            "key_words": key_words
        }
def log comment(comment):
    """
    Log the source comment, which outputs to csv
    """
    row = []
    text_comment = ""
```

```
          story title = ""
          # Check if already exists, if so return
          comment link = str(comment['comment_link'])
          cur.execute("SELECT * FROM comments WHERE comments.comment_link = %s",
                      [comment_link]}
          s = cur.fetchall()
          if len(s) > 0:
              return
          # Ignore any comment without comment or story title
          if comment['comment_text'] == None or len(comment['comment_text']) == 0:
              return
          if comment['story_title'] == None or len(comment['story_title']) == 0:
              return
          text_comment = BeautifulSoup(comment['comment_text'],
                                      "html.parser").get_text().encode('ascii', 'ignore')
          story title = BeautifulSoup(comment['story_title'],
                                      "html.parser").get_text().encode('ascii', 'ignore')
          story_url = comment['story_url']
          row.append(story_title)
          row.append(story_url)
          row.append(comment['author'])
          row.append('source')
          row.append(text_comment)
          title_sentiment      = analysis.find_sentiment(story_title)
          comment sentiment    = analysis.find_sentiment(text_comment)
          movie sentiment      = comment_sentiment["movie"]
          vader_sentiment      = comment_sentiment["vader"]
          naive sentiment      = comment_sentiment["naive"]
          overall sentiment    = comment_sentiment["overall"]
          overall_sentiment["subjects"] = overall_sentiment["subjects"]
          overall_sentiment["subjects"] = [x.lower() for x in overall_sentiment["subjects"]]
          key_words = dict.fromkeys(overall_sentiment["subjects"], 1)
          add_words_to_word_score(comment_sentiment, title_sentiment)
          add_story_to_story_score(comment_sentiment, story_title,
                                   str(comment['story_link']), story url, key_words)
          add_author_to_author_score(comment_sentiment, item link + str(comment['story_link']),
                                     comment['author'], key_words)
          row.append(', '.join(overall_sentiment["subjects"]))
          row.append(overall_sentiment["sentiment"])
          row.append(overall_sentiment["score"])
          row.append(comment ["comment_link"])
          row.append(comment ["discussion_link"])
          row.append(comment ["context_link"])
          row.append(comment['created_at'].split('.')[0].replace('T', ' '))
          row.append(datetime.datetime.now().strftime("%Y-%m-%d %H:%M:%S"))
          # updated_at comment_score.append(row)
      def get_all_comments_created_after(created_after):
          base url      = 'http://example.com/api/v1'
          date_search   = 'search_by_date'
          tags          ='tags=comment'
          time filter   = 'numericFilters=created_at_i>'
          perpage       = 'hitsPerPage='
          perpagehits   = '100'
          base url += date_search ['?' + tags
          url = base_url + '&' + perpage + perpagehits
          url +='&' + time_filter + str(created_after)
          # Quick test of the api
          resp = requests.get(url)
          if resp.status_code != 200:
              raise Exception("Could not connect")
          page_count    = resp.json()['nbPages']
          page          = 'page='
          for page number in range(page_count):
              api_comment_request(url + '&' + page + str(page_number))
      def api_comment_request(url):
          """
          make api request and run log
          :param url: url of the API request
          """
          print(url)
          resp = requests.get(url)
          if resp.status_code != 200:
              # This means something went wrong.
              raise "Could not connect"
          for item in resp.json()['hits']:
              log_comment(item)
      comment score = []
      word_score = {}
      story_score = {}
```

```
author_score = {}
minute        = 60
half_hour     = 30 * minute
hour          = 60 * minute
day           = 24 * hour
week          = 7 *day
time_between_calls = 5 * minute
analysis = SentimentAnalysis()
x = time.time() – time_between_calls
get_all_comments_created_after(x)
print(time.time() – start time)
source = "hacker news"
for row in comment_score:
    cur.execute("INSERT INTO comments (" +
                "story title, story_url, author, source, comment text, " +
                "subjects, sentiment, score, " +
                "comment link, discussion link, context_link, " +
                "created at, updated at" +
                ") VALUES (" +
                "%s, %s, %s, %s, %s, %s, %s, %s, %s, %s," +
                "%s, %s, %s)", row)
    ssys.stdout.flush()
    sys.stdout.write('.')
pg_word_score =H
for word in word_score:
    row = (word,
        source,
           word_score[word]["count"],
           word_score[word]["total_score"],
           datetime.datetime.now().strftime("%Y-%m-%d %H:%M:%S"),
           datetime.datetime.now().strftime("%Y-%m-%d %H:%M:%S"))
    cur.execute("INSERT INTO words " +
                "(word, source, count, total_score, created_at, updated_at) " +
                "VALUES (%s, %s, %s, %s, %s, %s)", row)
    sys.stdout.flush()
    sys.stdout.write('.')
for story in story_score:
    story_score[story]["key_words"]         = dict(story_score[story]["key_words"])
    story_score[story]["key_words"]         = sorted(story_score[story]["key_words"].items(),
                                                    key=operator.itemgetter(1))
    story_score[story]["key_words"]         = story_score[story]["key_words"][::-1]
    cur.execute("SELECT * FROM stories WHERE stories.discussion_link = %s",
                [story_score[story]["discussion_link"]])
    s = cur.fetchall()
    # INSERT if no priors found
    if len(s) == 0:
        row = [story,
            story_score[story]["story_url"],
            source,
            story_score[story]["discussion_link"],
            story_score[story]["count"],
            story_score[story]["total_score"],
            json.dumps(story_score[story]["key_words"]),
            datetime.datetime.now().strftime("%Y-%m-%d %H:%M:%S"), # created_at
            datetime.datetime.now().strftime("%Y-%m-%d %H:%M:%S")] # updated_at
        cur.execute("INSERT INTO stories " +
                    "(story_title, story_url, source, " +
                    "discussion_link, count, total_score, " +
                    "key_words,created_at, updated_at) " +
                    "VALUES (%s, %s, %s, %s, %s, %s, %s, %s, %s)", row)
    # UPDATE if found prior entry
    else:
        old_count          = s[0]
        old_total_score    = s[0][6]
        print("UPDATE Story", s[0][0],
            story, story_score[story]["story_url"], s[0][2])
        merged_dict = merge_two_dicts(dict(story_score[story]["key_words"]),
                                      dict(s[0][7]))
        row = [story,
            story_score[story]["story_url"],
            story_score[story]["count"] + old_count,
            story_score[story]["total_score"] + old_total_score,
            json.dumps(merged_dict),
            datetime.datetime.now().strftime("%Y-%m-%d %H:%M:%S")] # updated_at
    # Update to new values
    cur.execute("UPDATE stories SET " +
                "story_title=%s, story_url=%s," +
                "count=%s, total_score=%s, key_words=%s, updated_at=%s" +
                "WHERE stories.id =%s",
```

```
            row + [s[0][0]])
    # Make the changes to the database persistent
    conn.commit()
    sys.stdout.flush()
    sys.stdout.write('.')
for author in author_score:
    author_score[author]["key_words"]       = dict(author_score[author]["key_words"])
    author_score[author]["key_words"]       = sorted(author_score[author]["key_words"].items(),
                                                    key=operator.itemgetter(1))
    author_score[author]["key_words"]       = author_score[author]["key_words"]]::-1]
    row =[author,
          source,
          author_score[author]["count"],
          round(author_score[author]["total_score"] / author_score[author]["count"], 3),
          author_score[author]["stories"],
          author_score[author]["key_words"],
          datetime.datetime.now().strftime("%Y-%m-%d %H:%M:%S"), # created_at
          datetime.datetime.now().strftime("%Y-%m-%d %H:%M:%S")] # updated_at
    row [4] = json.dumps (dict(row[4])) # stories
    row [5] = json.dumps (dict(row[5])) # key_words
    cur.execute("INSERT INTO authors " +
                "(author, source, count, total_score, stories, " +
                "key_words, created_at, updated_at) " +
                "VALUES (%s, %s, %s, %s, %s, %s, %s, %s)", row)
    sys.stdout.flush()
    sys.stdout.write('.')
# Make the changes to the database persistent
conn.commit()
# Close communication with the database
cur.close()
conn.close()
```

A person of ordinary skill in the art will understand and appreciate that the foregoing example is merely one method implementing tracking of discussions within a computer network, and that additional commands and methods may be implemented to modify multiple parameters, such as specificity, and may change depending on the structure of the computer network or the needs of a user.

Below is an additional partial example of computer-implemented code, that when executed, is configured to generate a manifest of author topics in a system or network, the topics related to author expertise and knowledge, further based on a common subject matter discussed in a system or network.

```
from __future__ import print_function
import datetime
from operator import itemgetter
import collections
import json
import time
import csv
import os
import sys
import ast
# load the psycopg to connect to postgresql
import psycopg2
import psycopg2.extras
# Find the database parameters
filename_ignore_words = '../data/ignore_words.csv'
try:
    with open("../config/postgres.tsv", 'rb') as tsvfile:
        r = csv.reader(tsvfile, delimiter='\t')
        count = 0
        for row in r:
            params = ast.literal_eval(row[1])
except Exception:
    filename_ignore_words = '../../data/ignore_words.csv'
    filename_ignore_words_extra = '../../data/ignore_words_extras.csv'
    with open("../../config/postgres.tsv", 'rb') as tsvfile:
        r = csv.reader(tsvfile, delimiter='\t')
        for row in r:
            params = ast.literal_eval(row[1])
# Create list of ignore words
ignore_words = { }
with open(filename_ignore_words, 'r') as f:
    reader = csv.DictReader(f)
    for row in reader:
        ignore_words[row['ignore_words']] = True
# Try to connect
```

```
try:
    print("connecting to database")
                conn= psycopg2.connect(database=params["database"],
                                user=params["user"],
                                password=params["password"],
                                host=params["host"],
                                port=params["port"],
                                sslmode='require')
except:
    print("I am unable to connect to the database.")
    exit( )
"""
struct X = {
                        word: "",
                        count: 0,
                        last_discussed: time( )
                }
"""
author_subjects = { }
def reduce_count(word_struct, value):
    for key in word_struct.keys( ):
            word_struct[key]["count"] -= value
            word_struct[key]["count"] = round(word_struct[key]["count"], 3)
def add_count(author, author_subjects_local, new_subjects):
    """
    word is the word, supposed to be associated with author_subjects_local
    author_subjects_local should be the array of one of the subjects
    the new subjects should be removed prior to adding
    """
    for word in new_subjects:
            if word != author and word not in ignore_words:
                    not_found = True
                    if word in author_subjects_local:
                            now = datetime.datetime.now( ).strftime('%Y-%m-%d %H:%M:%S')
                            author_subjects_local[word]["count"] += 1.0
                            author_subjects_local[word]["last_access"] = now
                            not_found = False
                    if not_found:
                            author_subjects_local[word] = {
                                "count": 1.0,
                                "last_access": datetime.datetime.now( ).strftime('%Y-%m-%d %H:%M:%S')
                            }
cur = conn.cursor( )
start_id = '0'
end_id = '1000000000000000'
source  = sys.argv[1]
if len(sys.argv) == 4:
    start_id = sys.argv[2]
    end_id = sys.argv[3]
diff_id = int(end_id) − int(start_id)
if len(sys.argv) == 4:
    print("Attemptng to generating an author profile entry for %d authors, " % diff_id)
    print("found between id " + start_id + " and " + end_id + " in the authors "
            + "for the source '" + source + "'")
else:
    print("Attempting to update the author profiles, on entries since the last update")
start_running_time = time.time( )
# Default to 10 years ago
last_updated = (datetime.datetime.now( )
                        − datetime.timedelta(days=10*365)).strftime('%Y-%m-%d %H:%M:%S')
where_statement = "WHERE id >= " + start_id + " AND id < " + end_id
# If no ID listed, grab the most recent items (overrides id where statement)
if len(sys.argv) == 2:
    SQL = ("SELECT updated_at FROM author_profiles ORDER BY updated_at DESC LIMIT 1")
    cur.execute(SQL)
    entry = cur.fetchone( )
    if entry and len(entry) == 1:
            last_updated = entry[0].strftime('%Y-%m-%d %H:%M:%S')
            where_statement = "WHERE updated_at >= '" + last_updated + "'"
where_statement += " AND source = \'" + source +
SQL = ('SELECT DISTINCT author FROM authors " + where_statement)
cur.execute(SQL)
author_list = cur.fetchall( )
count       = 0
author_entries = [ ]
added_authors = { }
for author in author_list:
    # Check if author already added, if not skip
    if author in added_authors:
```

```
                continue
            added_authors[author] = True
            SQL = "SELECT author,source,key_words FROM authors "
            SQL += "WHERE authors.author = '" + author[0] + "'"
            SQL += "AND authors.source = '" + source + "'"
            # If no id range is specified, updated ONLY based on time
            # Alternatively if id range is specified, we override
            if len(sys.argv) == 2:
                SQL += "AND authors.created_at >= '" + last_updated + "'"
            cur.execute(SQL)
            subjects = cur.fetchall( )
            # If no id range is specified, updated ONLY based on time
            # Alternatively if id range is specified, we override
            if len(sys.argv) == 2:
                cur.execute("SELECT author,source,key_words FROM author_profiles "
                            + "WHERE author_profiles.author = %s "
                            + "AND author_profiles.source = %s", [author, source])
                profile = cur.fetchone( )
                if profile and len(profile) > 0 and len(profile[2]) > 2:
                    author_subjects[author] = profile[2]
            for subject in subjects:
                array = [ ]
                for word in subject[2]:
                    array.append(word)
                author_entries.append({
                    "author": subject[0],
                    "source": subject[1],
                    "subjects": array
                })
threshold = 35
print("\n%d author entries loaded for %d authors\n" % (len(author_entries),
                                                      len(added_authors)))
del(added_authors)
count = 0
for row in author_entries:
    author   = row["author"]
    subjects = row["subjects"]
    percent_complete = 100000 * (float(count) / float(len(author_entries)))
    if int(percent_complete) % 10 == 0:
        info = ("%3.3f percent complete" % (percent_complete/1000.0))
        if remote:
            print(info)
        else:
            sys.stdout.write('   %s\r' % info)
            sys.stdout.flush( )
    if author in author_subjects:
        if len(author_subjects[author]) >= threshold:
            reduce_count(author_subjects[author], 1.0 / threshold)
    else:
        author_subjects[author] = { }
    add_count(author, author_subjects[author], subjects)
    count += 1
subject_threshold = 1.0
print("\n\nDelete users below threshold: %d" % (subject_threshold))
print("\n================================\n")
authors = author_subjects.keys( )
for author in authors:
    try:
        if len(author_subjects[author]) < 1:
            print(author + " Deleted, Count: " +
str(author_subjects[author][0]['count']))
            del(author_subjects[author])
    except Exception as e:
        print(e)
        print("ERROR: " + author + ", DELETING")
        if author in author_subjects:
            del(author_subjects[author])
        continue
print("--------------------------------\n")
iter_count = 0
for author in author_subjects:
    print(author)
    print("------------------")
    total_experience = [ ]
    for key in author_subjects[author].keys( ):
        total_experience.append((key, author_subjects[author][key]["count"]))
    total_experience = collections.OrderedDict(total_experience)
    total_experience = sorted(total_experience.items( ),
                              key=lambda (k,v): (v,k), reverse=True)
```

-continued

```
    expertise = [ ]
    for word, count in total_experience[0:10]:
            print(word, count)
            expertise.append(word)
    current_time = datetime.datetime.now( ).strftime("%Y-%m-%d %H:%M:%S")
    row = [
            author, source, expertise,
            json.dumps(author_subjects[author]),
            len(author_subjects[author]),
            current_time, current_time,
            expertise, json.dumps(author_subjects[author]),
            len(author_subjects[author]),
            current_time
    ]
    cur.execute("INSERT INTO author_profiles ("
                            + "author, source, expertise, key_words, "
                            + "count, created_at, updated_at"
                            + ") VALUES (%s, %s, %s, %s, %s, %s, %s) "
                            + "ON CONFLICT (author, source) DO UPDATE SET "
                            + "expertise=%s, key_words=%s, "
                            + "count=%s, updated_at=%s", row)
    print("\n")
print("-------------------------------------\n\n")
print("\n\n")
print("(Count, Runtime)",
        (len(author_subjects),
        time.time( ) - start_running_time))
print("\n")
# Make sure the changes are committed to the database
conn.commit( )
# Close communications with the database
cur.close( )
conn.close( )
```

A person of ordinary skill in the art will understand and appreciate that the foregoing example is not the only way to generate a manifest of author topics in a system or network, and that additional commands may be implemented to modify multiple parameters, such as specificity, and may change depending on the structure of the network or the needs of a user.

In some embodiments, the code may be implemented remotely from one or more computers or mobile applications in connection with a linked database, or with access thereto such that a given content article may be accessed for collection and indexing.

Those of ordinary skill in the art will understand and appreciate that the foregoing description of the invention has been made with reference to certain exemplary embodiments of the invention, which describe a system and method for determining content relevance through ranked indexes. Those of skill in the art will understand that obvious variations in system configuration, protocols, parameters or properties may be made without departing from the scope of the invention which is intended to be limited only by the claims appended hereto.

What is claimed is:

1. A computer-implemented method of remotely identifying and retrieving at least one content article from a computer network, determining and ranking said content article based on relevance within the computer network, and generating a searchable database of ranked content, comprising the following steps:
   a. identifying at least one social profile;
   b. identifying at least one social indicator associated with the at least one social profile;
   c. assigning the at least one social profile to a user;
   d. categorizing, indexing, and adding to a generated interest graph at least one interest associated with the user;
   e. categorizing, indexing, and adding to a generated knowledge graph at least one area of knowledge associated with the user;
   f. estimating and assigning an expertise value to the user;
   g. estimating and assigning an insider knowledge value to the user
   h. generate at least one meta profile assigned to at least one user, comprising the expertise indicator, the at least one interest, and the at least one knowledge topic;
   i. generate a database comprising an entry for the at least one meta profile, the at least one meta profile further comprising: the expertise indicator, at least one expertise indicator, the knowledge indicator, at least one interest, at least one knowledge topic, and the at least one social profile;
   j. generate an index in the database comprising an entry for at least one topic;
   k. identify at least one content article associated with at least one topic;
   l. identify a number of meta profiles mentioning the content article;
   m. generate an expertise weight indicator assigned to the content article;
   n. generate a content total score indicator based on the number of meta profiles mentioning the content article and the expertise weight indicator, the content total score indicator being assigned to the content article; and
   o. generate a list including the at least one content article, with the list configured with a ranking order based on content total score.

2. The method of claim 1, further comprising the additional step of identifying at least one associate user having at least one owner and carrying out steps a-i with respect to the at least one associate user.

3. The method of claim 2, wherein the database entry for the user is linked to and associated to the database entry for the at least one associate user, thereby allowing access of one database entry through access of the other database entry during a search inquiry.

4. The method of claim 3, further comprising the additional step of identifying at least one topic within a computer network or subnetwork.

5. The method of claim 4, further comprising the following additional steps:
   a. generating a database entry for the at least one topic;
   b. aggregating the at least one meta profile and indexing the total score, expertise value, and insider knowledge value of the at least one meta profile into the database entry for the at least one topic;
   c. assigning a value to the database entry based on a number of meta profiles associated with the database entry; and
   d. assigning a value to the database entry indicating a level of relative quality of meta profiles associated with the database entry.

6. The method of claim 1, further comprising the step of assigning a modifying indicator to the at least one content article, the modifying indicator comprising a value based on a number of meta profiles associated with the content article, a number of meta profiles interacting with the content article, a relative quality level of meta profiles interacting with the content article, a relative level of expertise associated with the continent article, or a breadth of topical context associated with the content article.

7. The method of claim 6, further comprising the step of altering the content total score of the content article using the modifying indicator.

8. The method of claim 7, further comprising the step of identifying at least one newly created content article.

9. The method of claim 8, further comprising the step of identifying meta profiles within the database associated with the at least one newly created content article and linking the meta profile to the content article within the database.

10. The method of claim 9, further comprising the steps of
   a. identifying an author of the newly created content article;
   b. identifying a meta profile within the database associated with the author;
   c. collecting at least one piece of information from the newly created content article;
   d. indexing the at least one piece of information from the newly created content article in the meta profile within the database; and
   e. updating at least one other meta profile within the database associated with the newly created content article and associated meta profile.

11. The method of claim 1, further comprising the step of searching within the database of ranked content, which includes the following steps:
   a. inputting a search query;
   b. reviewing at least one database entry comprising at least one indicator value;
   c. organizing the at least one database entry based on the indicator value;
   d. identifying at least one database entry comprising at least one insufficient indicator value;
   e. removing at least one database entry comprising at least one insufficient indicator value; and
   f. producing a list of search results.

12. The method of claim 11, further comprising at the step of reviewing at least one database entry and identifying at least one association between the at least one database entry and at least one other database entry.

13. The method of claim 12, wherein the indicator value of a first database entry is based on at least one of the following: a number of other database entries associated with the first database entry, a representation of at least one indicator value assigned to at least one other database entry associated with the first database entry, or a number of other database entries comprising substantially similar attributes as the first database entry.

14. The method of claim 13, further comprising the step of modulating at least one indicator value of at least one database entry based on at least one indicator value of at least one other database entry.

15. The method of claim 14, further comprising the step of incorporating at least one other database entry into the list of search results where the at least one other database entry shares one or more attribute with at least one database entry within the list of search results.

16. A non-transitory computer-readable medium for remotely identifying and retrieving at least one content article from a computer network, determining and ranking said content article based on relevance within the computer network, and generating a searchable database of ranked content; the medium comprising stored instructions that when executed by at least one processor, perform the following steps:
   a. remotely searching for, identifying, and indexing at least one social profile comprising one social indicator, the social profile being stored in a database of the computer;
   b. assigning the at least one social profile to a known user within the network;
   c. categorizing, indexing, and graphing at least one interest and at least one area of knowledge associated with the known user and storing the interest and area of knowledge with the social profile;
   d. estimating and assigning an expertise value and an insider knowledge value to the known user and storing the interest and area of knowledge with the social profile;
   e. generating at least one meta profile within the database and assigned to the known user, the meta profile comprising the expertise value, the insider knowledge value, the at least one interest, the at least one area of knowledge, and the social profile;
   f. generating an index in the database comprising an entry for at least one topic, identifying at least one content article associated with the topic, and identifying at least one meta profile within the database associated with the content article;
   g. generating an expertise weight indicator assigned to the content article;
   h. generating a content total score indicator based on the number of meta profiles within the database associated with the content article and the expertise weight indicator, the content total score indicator being assigned to the content article within the database; and
   i. generating a list of at least one content article within the database, with the list configured with a ranking order based on content total score.

17. A system for determining relevancy of content articles within a given computer network or subnetwork, comprising:
- a. a processor that remotely searches and identifies at least one user by collecting, indexing, and generating a database comprising at least one social profile within the network;
- b. a first memory configured to store the at least one social profile;
- c. wherein the processor further generates a database comprising at least one meta profile by parsing discussions and actions taken by at least one user within the network and identifying at least one stored social profile associated with the user;
- d. a second memory configured to store the at least one meta profile;
- e. wherein the processor further updates the at least one meta profile by searching the network, identifying at least one content article, and assigning the content article to an associated meta profile;
- f. wherein the processor further assigns a ranking order to the at least one meta profile by calculating and assigning at least one indicator value to the meta profile, the indicator value being based on at least one of the following: interactions with other users within the computer network, association with at least one other already-ranked meta profile, at least one identified characteristic of an associated social profile or meta profile, or at least one identified characteristic of an associated user;
- g. wherein the processor further generates search results based on user-implemented search queries and the ranking-order of the at least one meta profile; and
- h. wherein the processor further updates the database based on ranking order, newly collected data from the network, and at least one user-implemented search query.

* * * * *